US012682617B1

(12) United States Patent
Ozdemir et al.

(10) Patent No.: US 12,682,617 B1
(45) Date of Patent: Jul. 14, 2026

(54) TECHNIQUES FOR IMPROVING DATA EFFICIENCY IN IMAGE-BASED MACHINE LEARNING

(71) Applicant: Bentley Systems, Incorporated, Exton, PA (US)

(72) Inventors: Oscar Ozdemir, Quebec City (CA); Marc-André Gardner, Quebec City (CA); Karl-Alexandre Jahjah, Quebec City (CA); Marc-André Lapointe, Quebec City (CA); Louis-Philippe Asselin, Quebec City (CA)

(73) Assignee: Bentley Systems, Incorporated, Exton, PA (US)

( * ) Notice: Subject to any disclaimer, the term of this patent is extended or adjusted under 35 U.S.C. 154(b) by 251 days.

(21) Appl. No.: 18/537,438

(22) Filed: Dec. 12, 2023

(51) Int. Cl.
| | |
|---|---|
| *G06V 10/74* | (2022.01) |
| *G06F 18/21* | (2023.01) |
| *G06F 18/2413* | (2023.01) |
| *G06V 10/774* | (2022.01) |
| *G06V 10/776* | (2022.01) |
| G06F 11/14 | (2006.01) |

(52) U.S. Cl.
CPC .......... *G06V 10/774* (2022.01); *G06F 18/217* (2023.01); *G06F 18/2413* (2023.01); *G06V 10/761* (2022.01); *G06V 10/776* (2022.01); *G06F 11/1476* (2013.01)

(58) Field of Classification Search
CPC .. G06V 10/774; G06V 10/761; G06V 10/776; G06F 18/217; G06F 18/2413; G06F 11/1476
See application file for complete search history.

(56) References Cited

U.S. PATENT DOCUMENTS

| | | | |
|---|---|---|---|
| 11,100,373 B1 | 8/2021 | Crosby et al. | |
| 2007/0217676 A1* | 9/2007 | Grauman | ............. G06V 10/764 |
| | | | 382/190 |
| 2021/0117760 A1* | 4/2021 | Krishnan | ............. G06N 3/0464 |

(Continued)

OTHER PUBLICATIONS

Peng et al, Active Learning for Lane Detection: A Knowledge Distillation Approach, 2021, IEEE/CVF International Conference on Computer Vision, pp. 1-11. (Year: 2021).*

(Continued)

*Primary Examiner* — Kathleen M Broughton
(74) *Attorney, Agent, or Firm* — Cesari and McKenna, LLP; James A. Blanchette

(57) ABSTRACT

In example embodiments, a dataset labeling software process combines diversity selection and with one or more uncertainty selection techniques in a multi-stage process that produces a labeled training dataset for training an image-based ML model. In an initial stage, diversity selection alone may be used to seed a labeled training dataset. In a subsequent stage, diversity selection may be combined with a first procedure for computing uncertainty (e.g., uncertainty selection based on ensemble learning) to build the labeled training dataset until a first stopping condition is met. Optionally, in a still further stage, diversity selection may be combined with a second, different procedure for computing uncertainty (e.g., uncertainty selection based on Monte Carlo (MC) dropout) to further build the labeled training dataset until a second stopping condition is met.

20 Claims, 9 Drawing Sheets

(56)                    References Cited

U.S. PATENT DOCUMENTS

| | | | |
|---|---|---|---|
| 2021/0295213 A1* | 9/2021 | Raveh | G06V 10/774 |
| 2023/0343075 A1* | 10/2023 | Xiang | G06V 40/171 |
| 2024/0005203 A1* | 1/2024 | Chandelier | G06N 3/098 |
| 2024/0395025 A1* | 11/2024 | Mavroeidis | G06V 10/776 |

OTHER PUBLICATIONS

Elhamifar et al, Dissimilarity-based Sparse Subset Selection, 2016, arXiv:1407.6810v2, pp. 1-18. (Year: 2016).*

U.S. Appl. No. 17/976,383, filed Oct. 28, 2022 by Karl-Alexandre Jahjah et al., entitled "Techniques for Customizing a Machine Learning Model for the Source Data and Needs of a Specific User", 30 pages.

U.S. Appl. No. 17/954,694, filed Sep. 28, 2022 by Karl-Alexandre Jahjah et al., entitled "Techniques for Labeling Elements of an Infrastructure Model With Classes", 33 pages.

"Welcome to segmentation_models_pytorch's documentation!" downloaded from the Internet Dec. 12, 2023, 8 pages [https://segmentation-modelspytorch.readthedocs.io/en/latest/].

Sandler et al., "MobileNetV2: Inverted Residuals and Linear Bottle-necks" 2018 IEEE/CVF Conference on Computer Vision and Pattern Recognition, 11 pages.

De Lange et al., "A Continual Learning Survey: Defying Forgetting in Classification Tasks", IEEE Transactions on Pattern Analysis and Machine Intelligence, vol. 44, No. 7, Jul. 2022, 20 pages.

Chen, "Lifelong Machine Learning for Topic Modeling and Beyond," Proceedings of NAACL-HLT 2015 Student Research Workshop, Jun. 1, 2015, 7 pages.

Bohn et al., "Towards a Unified Lifelong Learning Framework," Journal of Machine Learning Research 148:221-235, 2021, NeurtIPS 2020 Preregistration Workshop, 15 pages.

Settles, Burr, "Active Learning Literature Survey" Computer Sciences Technical Report 1648, University of Wisconsin-Madison, Updated Jan. 26, 2010, 67 pages.

Beluch et al., "The power of ensembles for active learning in image classification", 2018 IEEE/CVF Conference on Computer Vision and Pattern Recognition, 10 pages.

Sener et al., "Active Learning for Convolutional Neural Networks: A Core-Set Approach", ICLR 2018, 13 pages.

* cited by examiner

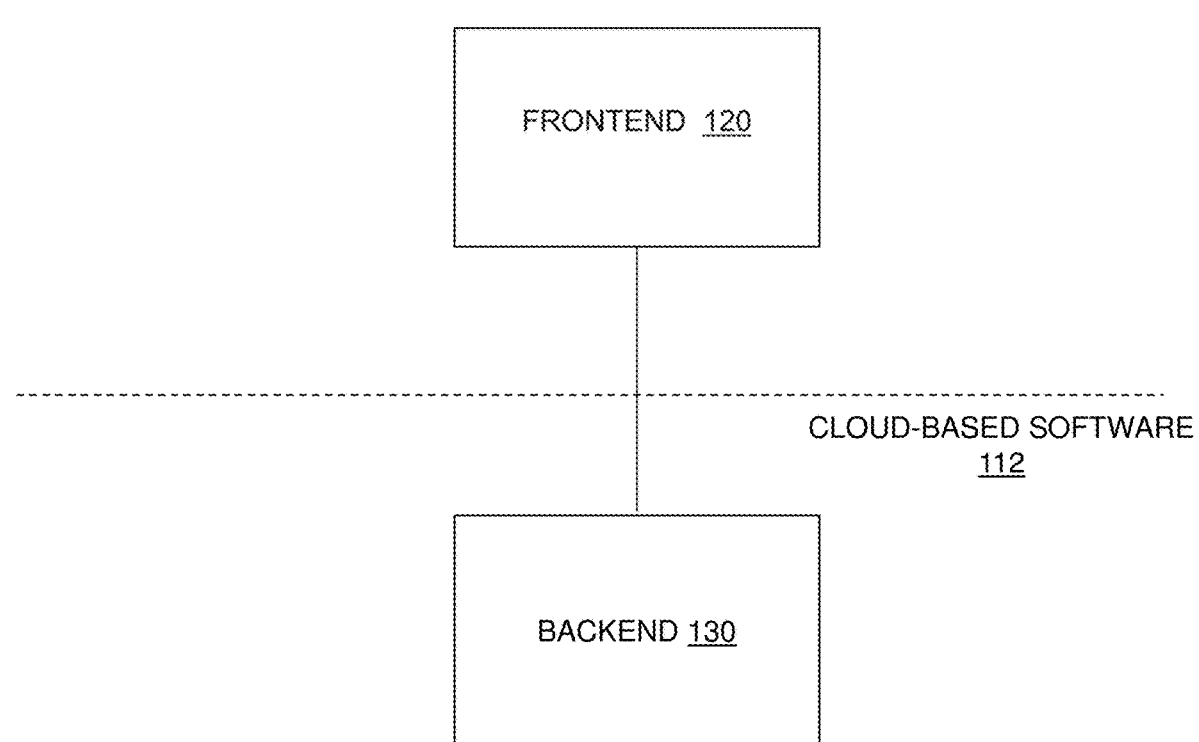
FRONTEND 120
CLOUD-BASED SOFTWARE
112
BACKEND 130
*Fig. 1*

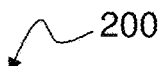
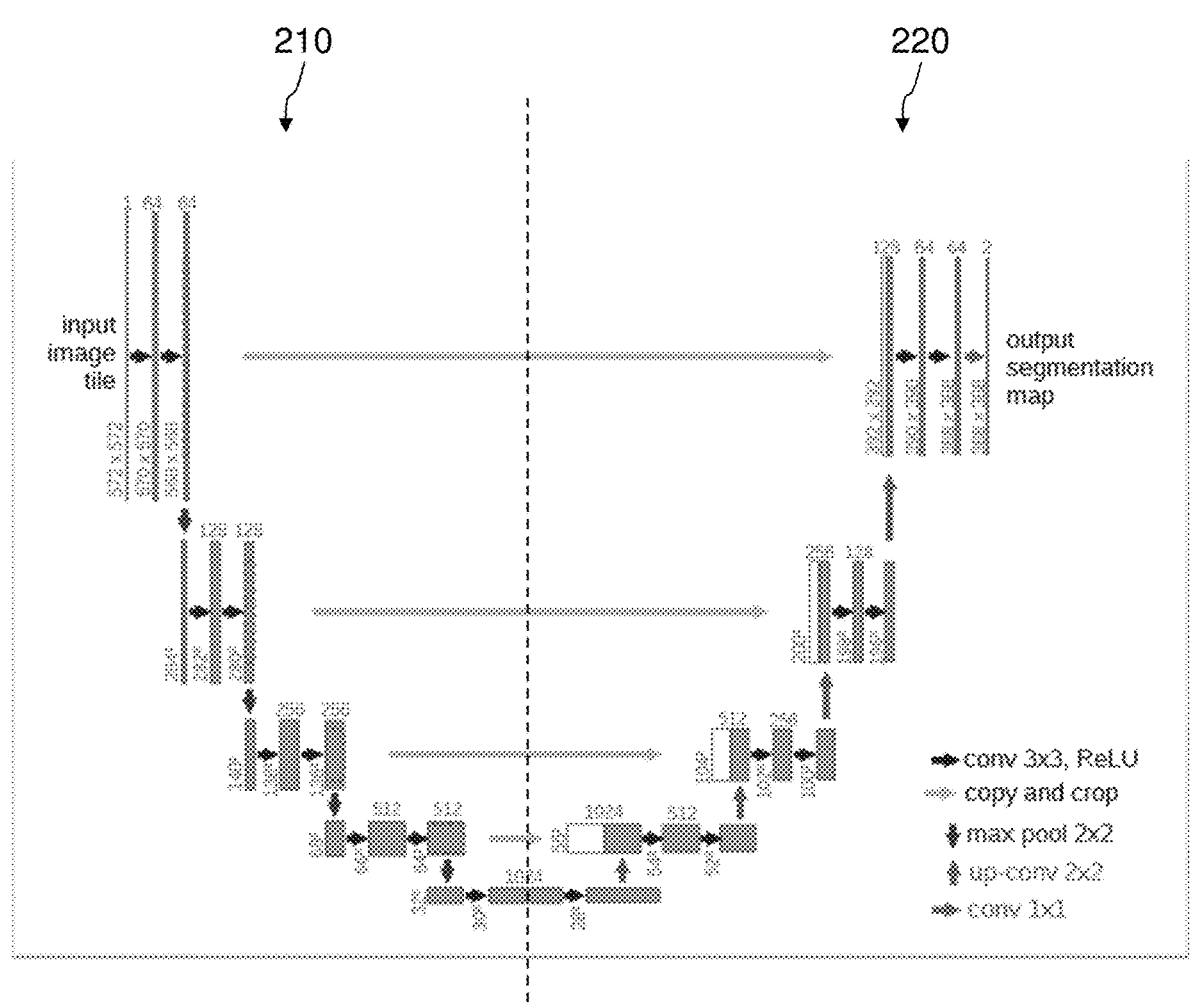
*Fig. 2*

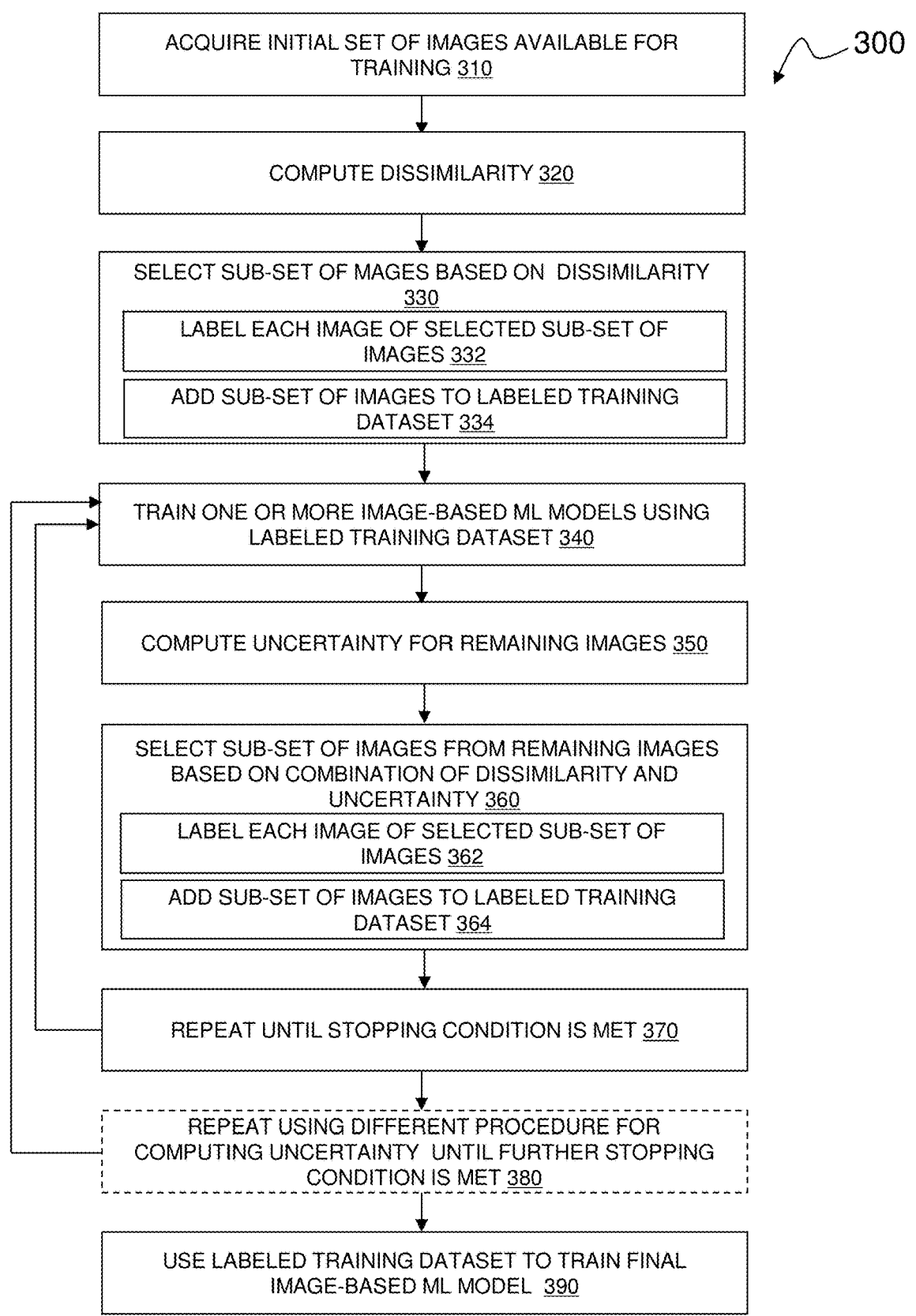

ACQUIRE INITIAL SET OF IMAGES AVAILABLE FOR TRAINING 310

300

COMPUTE DISSIMILARITY 320

SELECT SUB-SET OF MAGES BASED ON DISSIMILARITY 330

LABEL EACH IMAGE OF SELECTED SUB-SET OF IMAGES 332

ADD SUB-SET OF IMAGES TO LABELED TRAINING DATASET 334

TRAIN ONE OR MORE IMAGE-BASED ML MODELS USING LABELED TRAINING DATASET 340

COMPUTE UNCERTAINTY FOR REMAINING IMAGES 350

SELECT SUB-SET OF IMAGES FROM REMAINING IMAGES BASED ON COMBINATION OF DISSIMILARITY AND UNCERTAINTY 360

LABEL EACH IMAGE OF SELECTED SUB-SET OF IMAGES 362

ADD SUB-SET OF IMAGES TO LABELED TRAINING DATASET 364

REPEAT UNTIL STOPPING CONDITION IS MET 370

REPEAT USING DIFFERENT PROCEDURE FOR COMPUTING UNCERTAINTY UNTIL FURTHER STOPPING CONDITION IS MET 380

USE LABELED TRAINING DATASET TO TRAIN FINAL IMAGE-BASED ML MODEL 390

IMAGES
402

APPLY IMAGES TO ENCODER TO PRODUCE ENCODINGS
410

Encodings 412

CALCULATE SIMILARITY MEASURE BETWEEN EACH
ENCODING 420

ORGANIZE SIMILARITY MEASURES INTO SIMILARITY
MATRIX 430

SIMILARITY MATRIX
432

CALCULATE DIVERSITY METRIC FOR EACH IMAGE 440

DIVERSITY METRIC
442

500

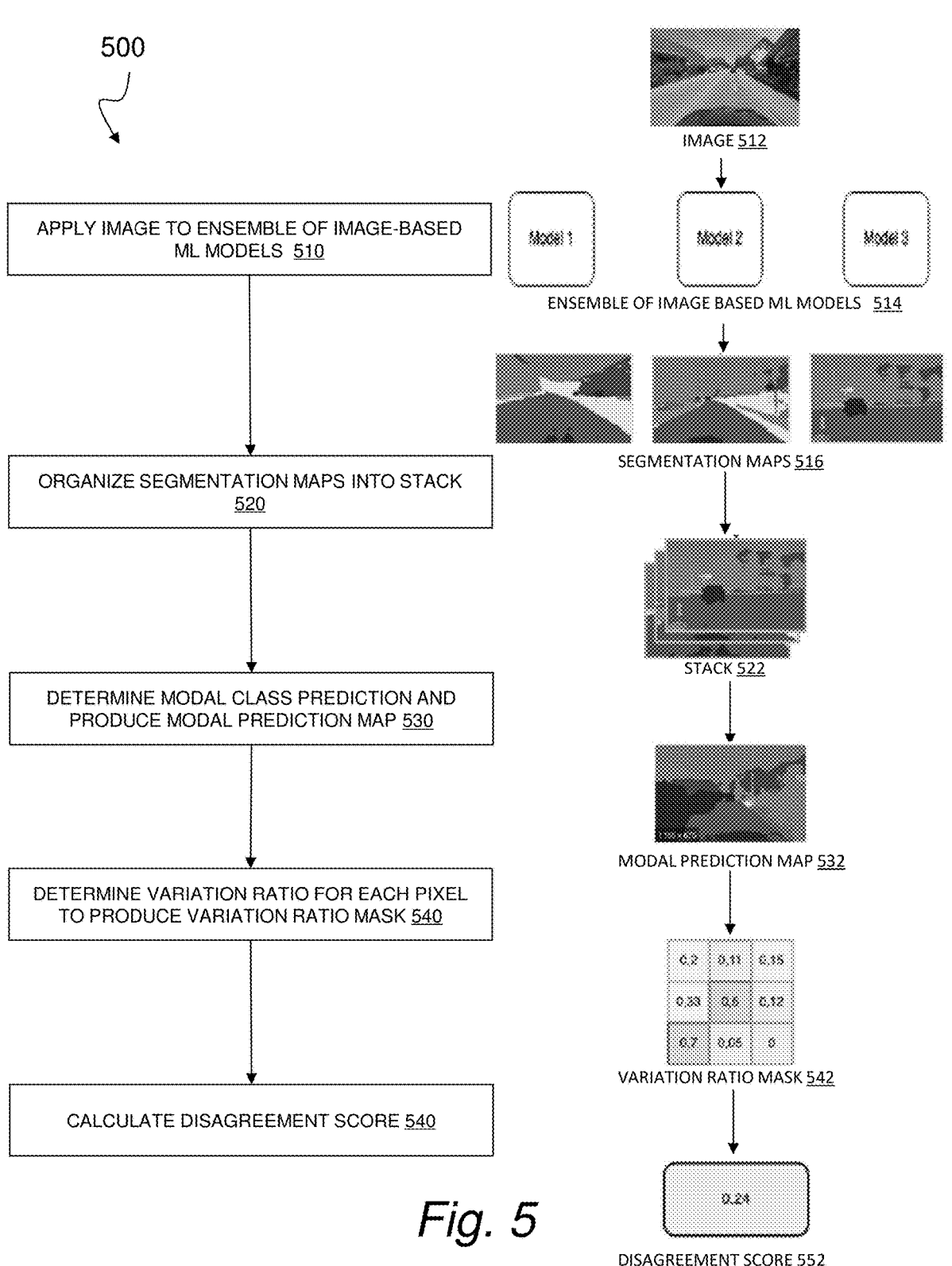

IMAGE 512

APPLY IMAGE TO ENSEMBLE OF IMAGE-BASED ML MODELS  510

ENSEMBLE OF IMAGE BASED ML MODELS  514

SEGMENTATION MAPS 516

ORGANIZE SEGMENTATION MAPS INTO STACK 520

STACK 522

DETERMINE MODAL CLASS PREDICTION AND PRODUCE MODAL PREDICTION MAP 530

MODAL PREDICTION MAP 532

DETERMINE VARIATION RATIO FOR EACH PIXEL TO PRODUCE VARIATION RATIO MASK 540

VARIATION RATIO MASK 542

CALCULATE DISAGREEMENT SCORE 540

DISAGREEMENT SCORE 552

*Fig. 5*

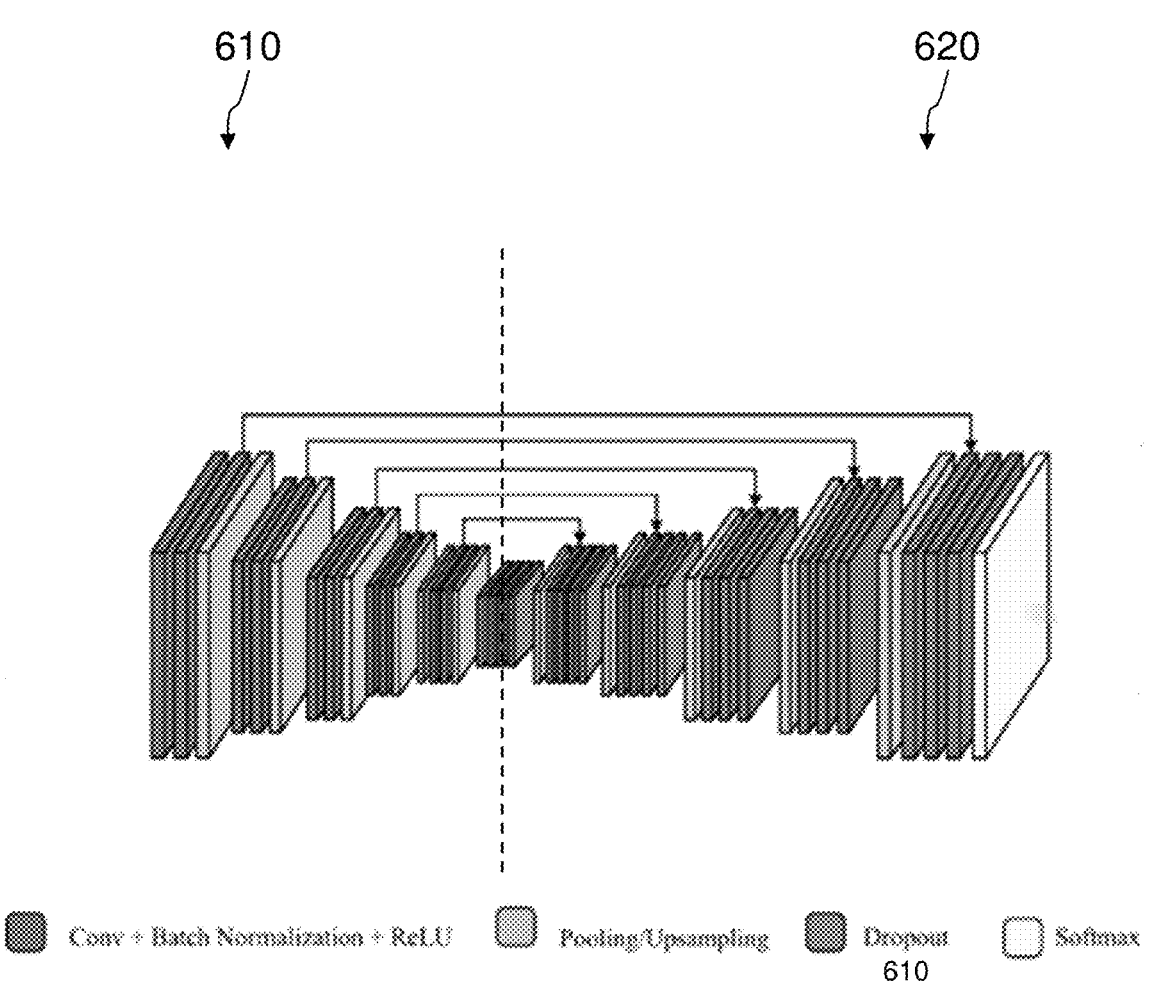
*Fig. 6*

700

REPEATEDLY APPLY IMAGE TO SINGLE IMAGE-
BASED ML MODEL WITH DIFFERENT WEIGHTS
DISABLED VIA MONTE-CARLO DROPOUT  710

ORGANIZE SEGMENTATION MAPS INTO STACK
720

DETERMINE MODAL CLASS PREDICTION AND
PRODUCE MODAL PREDICTION MAP 730

DETERMINE VARIATION RATIO FOR EACH PIXEL
TO PRODUCE VARIATION RATIO MASK 740

CALCULATE DISAGREEMENT SCORE 740

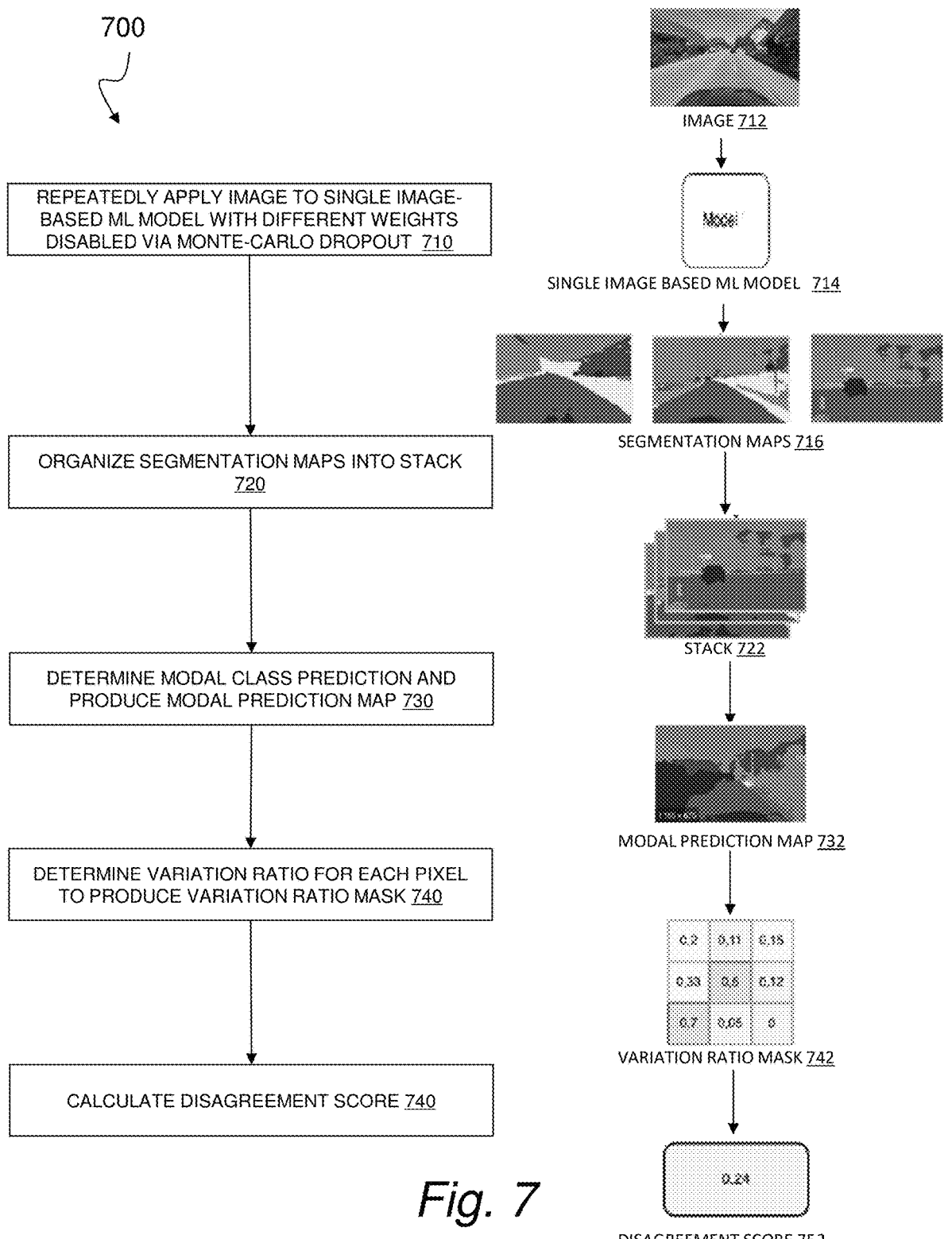

IMAGE 712

SINGLE IMAGE BASED ML MODEL  714

SEGMENTATION MAPS 716

STACK 722

MODAL PREDICTION MAP 732

VARIATION RATIO MASK 742

DISAGREEMENT SCORE 752

*Fig. 7*

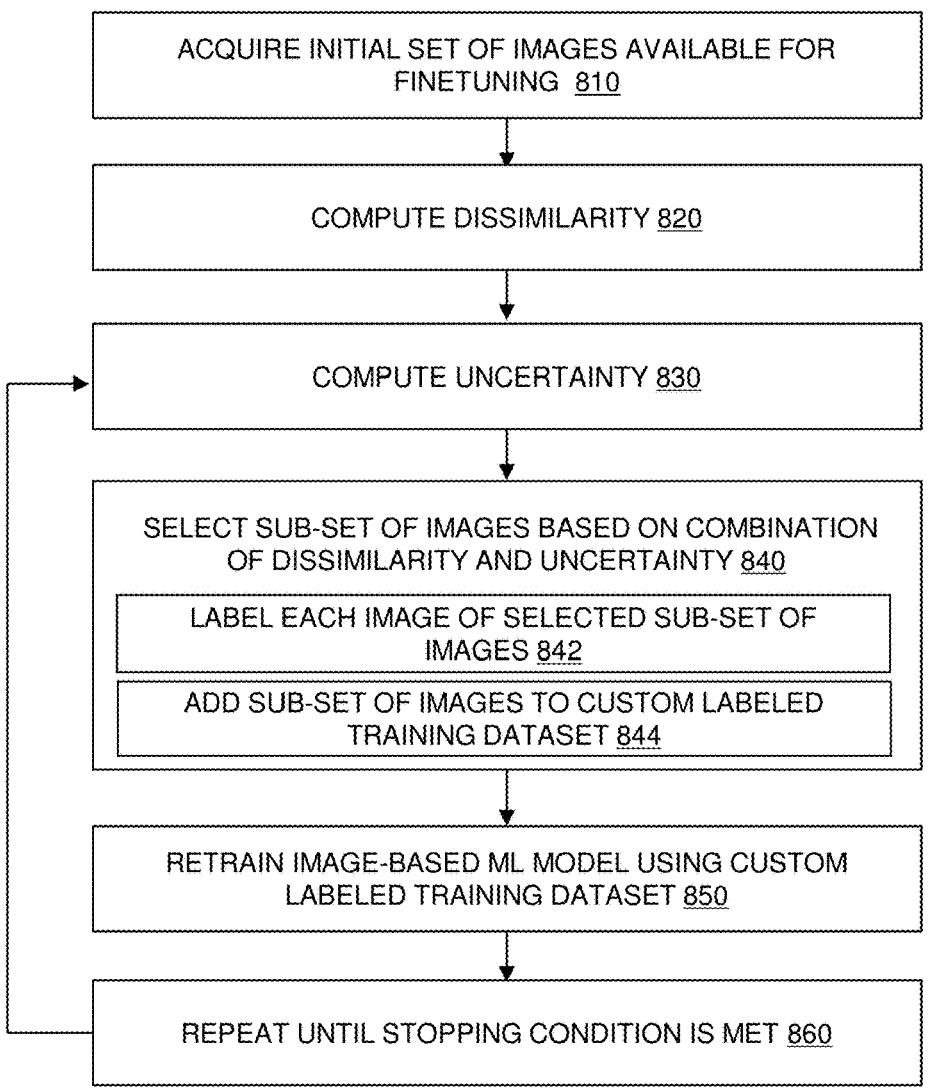
*Fig. 8*

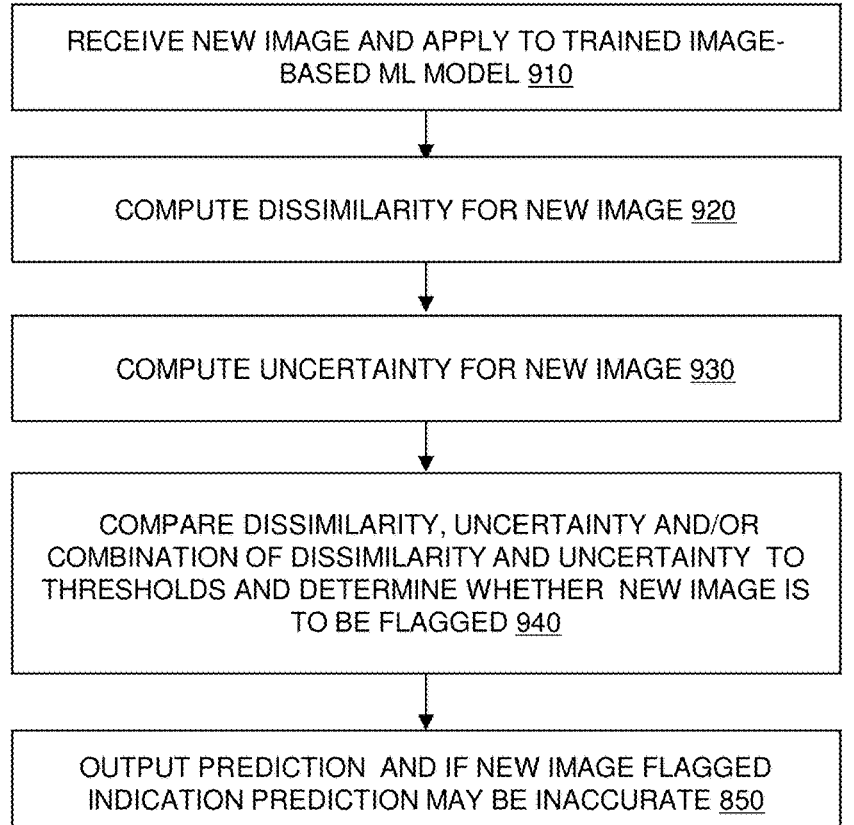

RECEIVE NEW IMAGE AND APPLY TO TRAINED IMAGE-BASED ML MODEL 910

COMPUTE DISSIMILARITY FOR NEW IMAGE 920

COMPUTE UNCERTAINTY FOR NEW IMAGE 930

COMPARE DISSIMILARITY, UNCERTAINTY AND/OR COMBINATION OF DISSIMILARITY AND UNCERTAINTY TO THRESHOLDS AND DETERMINE WHETHER NEW IMAGE IS TO BE FLAGGED 940

OUTPUT PREDICTION AND IF NEW IMAGE FLAGGED INDICATION PREDICTION MAY BE INACCURATE 850

*Fig. 9*

TECHNIQUES FOR IMPROVING DATA EFFICIENCY IN IMAGE-BASED MACHINE LEARNING

BACKGROUND

Technical Field

The present disclosure relates generally to training machine-learning (ML) models and more specifically to techniques for improving data efficiency in training image-based ML models.

Background Information

ML models are becoming increasingly widely used for classification and analysis in a number of engineering fields. One such field is the design, construction and maintenance of infrastructure (i.e., bridges, buildings, dams, railways, highways, etc.). Among a large variety of different task, ML models may be used for image classification and analysis (ML models used for such tasks being referred to herein as "image-based ML model"). One example of image classification and analysis is the detection of deterioration (e.g., rust) on infrastructure. All infrastructure deteriorates over time. Deterioration (e.g., rust) may reduce stiffness and cause material discontinuities, which if unaddressed can cause further damage and possibly total failure. While some deterioration (e.g., rust) may be hidden on internal components or below layers of paint, often rust is visible upon the surface of exposed components. Early detection of such deterioration (e.g., rust), and repair of the related area is important for maximizing the service life of infrastructure.

Various types of ML models may be trained for image classification and analysis tasks, such as detection of deterioration (e.g., rust) on infrastructure. One example image-based ML model is a semantic segmentation model. A semantic segmentation model typically classifies each pixel of an image to produce a pixel-wise segmentation map. For example, when applied to the detection of deterioration (e.g., rust) on infrastructure, the segmentation map may indicate presence of a type of deterioration (e.g., type of rust, such as real rust, a rust fade, a rust stain, etc.) pixel-by-pixel.

Before they can produce useful predictions, image-based ML models need to be trained, for example on a labeled training dataset. Such a labeled training dataset typically includes a number of images in which have been regions (e.g., pixels) have been annotated with a quality desired to be detected. For example, in the case of detection of deterioration (e.g., rust) on infrastructure, pixel-wise annotations may indicate the presence of types of deterioration (e.g., types of rust). Conventional thinking suggests that the larger the labeled training dataset the more effectively the image-based ML model can be trained. Therefore, it is not uncommon attempt to assemble many thousands, or even tens of thousands, of labeled images.

However, producing large, labeled training datasets is a highly resource intensive task. One must first capture all the images. In the case of detection of deterioration (e.g., rust) on infrastructure this may involve dispatching engineers or other workers to photograph numerous pieces of infrastructure, using handheld digital cameras, drones, or other specialized equipment. One then labels each of the images. In the case of detection of deterioration (e.g., rust) on infrastructure this may involve a human expert reviewing and then adding annotations to each image indicate the presence of types of deterioration (e.g., types of rust). Human experts typically find annotating images to be extremely tiring and tedious, and to preserve moral and prevent error from drifting thoughts, the task may need to be limited to only a few hours a day. As such, labeling training datasets typically takes long periods of time (e.g., many weeks).

Various attempts have been made to improve the efficiency of producing labeled training datasets. For example, some assisted labeling techniques have been developed which may speed annotation of each image. This may reduce the time expended to label each image. However, it typically does not reduce the number of images that are labeled. As such, the burdens of image capture are not addressed. Further, even if per-image labeling time is somewhat reduced, it still may take significant time to label all the images if there are thousands, or tens of thousands, of images.

Likewise, some active learning techniques have been developed that attempt to select the most "interesting" images within a pool of unlabeled images for inclusion in a labeled training dataset. While this could theoretically reduce the number of images that need to be labeled, existing active learning techniques suffer a number of shortcomings. Some active learning techniques consume excessive amounts of computing resources (e.g., processing and memory resources), such that they widespread deployment may be burdensome.

Further, some active learning techniques may not be very effective. For example, some active learning techniques select images believed to contain a lot of "new" information (i.e., information that an image-based ML model has not been previously exposed to). However, the "new" information may all be very similar (i.e., "new" in the same way). For example, the "new" information may all represent the same "new" object, or same kind of "new" object. Training on a set of images that are too similar may impair generalization and decrease performance of an image-based ML model.

Still further, some active learning techniques may select images that are highly diverse. However, the images may not convey much "new" information. Training on such a set of images may be inefficient, since exposing an image-based ML model to more examples of a task it is already good at typically will not significantly improve performance. As a result of such shortcomings and inefficacies, existing active learning techniques have not solved the problem of dataset labeling.

Accordingly, there is a need for techniques that may improve data efficiency in training image-based ML models.

SUMMARY

In various embodiments, a dataset labeling software process combines diversity selection and with one or more uncertainty selection techniques in a multi-stage process that produces a labeled training dataset for training an image-based ML model. In an initial stage, diversity selection alone may be used to seed a labeled training dataset. In a subsequent stage, diversity selection may be combined with a first procedure for computing uncertainty (e.g., uncertainty selection based on ensemble learning) to build the labeled training dataset until a first stopping condition is met. The first procedure for computing uncertainty may prioritize reduction of the size of the labeled training dataset over computing resource consumption (i.e., data efficiency over computation efficiency). Optionally, in a still further stage, diversity selection may be combined with a second, different procedure for computing uncertainty (e.g., uncertainty selection based on Monte Carlo (MC) dropout) to further build the labeled training dataset until a second stopping condition is met. The second different procedure for computing uncertainty may prioritize reduction of needed computing resources (e.g., processing and memory resources) over reduction of the size of the labeled training dataset (i.e., computation efficiency over data efficiency). By balancing between the utilization of the stages, performance requirements of an individual training task may be met.

In one specific embodiment, a method is provided for training an image-based ML model. A software process executing on one or more computing devices computes dissimilarity between each image of an initial set of images available for training. The software process further selects a first sub-set of images from the initial set of images based on the dissimilarity from each other, labels the first sub-set of images, and adds the labeled first sub-set of images to a labeled training dataset. One or more image-based ML models are trained on the labeled training dataset. The software process computing an uncertainty of the one or more image-based ML models for remaining images of the initial set of images. The software process further selects a second sub-set of images from the remaining images of the initial set of images based on a combination of the dissimilarity from each other and the uncertainty of the one or more image-based ML models, labels the second sub-set of images, and adds the second sub-set of images to the labeled training dataset. The software process repeats training the one or more image-based ML models, computing the uncertainty of the one or more image-based ML models, and selecting the second sub-set of images until a stopping condition is met to build the labeled training dataset. The labeled training dataset is used to train an image-based ML model.

In another specific embodiment, a method is provided for finetuning an image-based ML model. A software process executing on one or more computing devices computes a dissimilarity between each image of an initial set of images available for finetuning. The software process also computes an uncertainty of the image-based ML model for each image of the initial set of images. The software process selects a sub-set of images from the initial set of images based on a combination of the dissimilarity from each other and the uncertainty for each image, labels the sub-set of images, and adds the sub-set of images to a custom labeled training dataset. The image-based ML model is retrained with the custom labeled training dataset. The software process repeats computing the uncertainty, selecting the sub-set of images, and training the ML model using the remaining images of the initial set of image until a further stopping condition is met to finetune the image-based ML model.

In still another specific embodiment, a non-transitory computing device readable medium is provided. The medium has instructions stored thereon that when executed by one or more computing devices are operable to compute a dissimilarity between each image of an initial set of images available for training and to compute an uncertainty of one or more image-based ML models for each image of the initial set of images. The instructions when executed are further operable to select a sub-set of images from the initial set of images based on a combination of the dissimilarity from each other and the uncertainty, label the sub-set of images, and add the sub-set of images to a labeled training dataset. The instructions when executed are further operable to repeat the computing the uncertainty and the selecting the sub-set of images until a stopping condition is met to build the labeled training dataset and to use the labeled training dataset to train an image-based ML model.

It should be understood that a wide variety of additional features and alternative embodiments may be implemented other than those discussed in this Summary. This Summary is intended simply as a brief introduction to the reader for the further description that follows and does not indicate or imply that the examples mentioned herein cover all aspects of the disclosure or are necessary or essential aspects of the disclosure.

BRIEF DESCRIPTION OF THE DRAWINGS

The description refers to the accompanying drawings of example embodiments, of which:

FIG. 1 is a high-level block diagram of an example dataset labeling software process that may be used to produce a labeled training dataset;

FIG. 2 is a block diagram of an example image-based ML model (e.g., semantic segmentation model) structured according to an encoder-decoder architecture (e.g., a U-Net architecture);

FIG. 3 is an example sequence of steps that may be performed to produce a labeled training dataset and train an image-based ML model;

FIG. 5 is a diagram providing further details of an example technique for computing a disagreement score that measures disagreement between predictions of each of an ensemble of image-based ML models that may be executed as part of FIG. 3;

FIG. 6 is a block diagram of an example image-based ML model (e.g., semantic segmentation model) that includes always-active dropout layers;

FIG. 7 is a diagram providing further details of an example technique for computing a disagreement score between predictions of a single image-based ML model with different weights set to zero that may be used when repeating steps of FIG. 3 with Monte-Carlo dropout;

FIG. 8 is a sequence of steps that may be performed to produce a custom labeled training dataset and finetune an image-based ML model; and FIG. 9 is a sequence of steps that may be performed to provide cues when predictions of a trained image-based ML model may be inaccurate.

DETAILED DESCRIPTION

Figure 4:
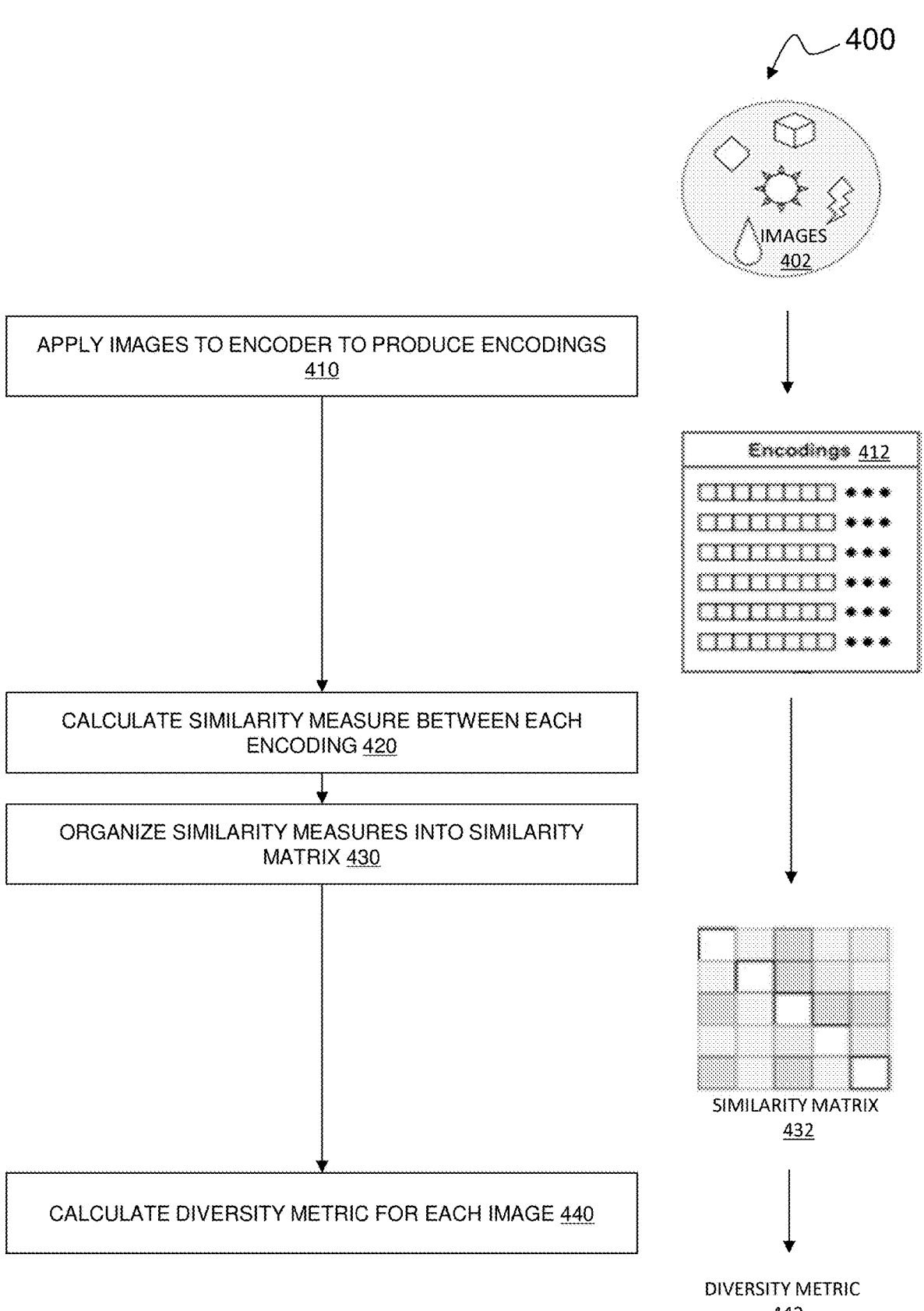
FIG. 4 is a diagram providing further details of an example technique for computing dissimilarity between images that may be executed as part of FIG. 3.

The following description describes example embodiments. Any references to items in the singular should be understood to include items in the plural, and vice versa, unless explicitly stated or otherwise clear from the context. Grammatical conjunctions are intended to express any and all disjunctive and conjunctive combinations of conjoined clauses, sentences, words, and the like, unless otherwise stated or clear from the context. For example, the term "or" should be understood to mean "and/or." Any recitations of ranges of values are not intended to be limiting, are provided as examples only, and are not intended to constitute a limitation on the scope of the described embodiments. Further, any recitation of ranges should be interpreted as referring individually to any and all values falling within the range, unless otherwise indicated, and each separate value within such the range should be treated as if it were individually recited. Terms of approximation such as "about," "approximately," "substantially" or the like, should be construed as referring to an allowance for deviation that is appreciated by one of ordinary skill in the art. Terms of relative ordering or orientation, such as "first," "last," "greatest", "lowest", "top," "bottom," and the like, should be understood to be used relative to a standard of comparison or perspective, and do not preclude differing orderings or orientations based on different standards of comparison or perspectives. No language in the description should be construed as indicating an element is a necessary or essential aspect of the disclosure.

FIG. 1 is a high-level block diagram of an example dataset labeling software process 100 that may be used to produce a labeled training dataset. The dataset labeling software process 100 may be a stand-alone software application or a component of a larger software application, for example, a ML model training application. The process 100 may be divided into local software 110 that executes on one or more computing devices local to an end-user (collectively "local devices") and, in some cases, cloud-based software 112 that is executed on one or more computing devices remote from the end-user (collectively "cloud computing devices") accessible via a network (e.g., the Internet). Each computing device may include processors, memory/storage, a display screen, and other hardware (not shown) for executing software, storing data and/or displaying information. The local software 110 may include frontend software 120 operating on a local device. The cloud-based software 112 may include, in some cases, backend software 130 operating on cloud computing devices. The frontend software 120 may provide user interface functionality as well as perform certain non-processing intensive operations. The backend software 130 may perform more processing intensive operations.

The labeled training dataset produced by the dataset labeling software process 100 may be used (e.g., by other software) to train an image-based ML model. In one embodiment, the image-based ML model is a semantic segmentation model structured according to an encoder-decoder architecture (e.g., a U-Net architecture). However, it should be understood that a wide variety of other types of models and architectures may alternatively be used.

FIG. 2 is a block diagram 200 of an example image-based ML model (e.g., semantic segmentation model) structured according to an encoder-decoder architecture (e.g., a U-Net architecture). The encoder 210 is the first half of the model. It may include convolutional layers, activation functions, and pooling layers to gradually reduce the spatial dimensions of images into respective encodings (e.g., vectors) that represent features. The convolutional layers extract information at multiple scales from images by applying a set of learnable filters. Following each convolutional layer, an activation function is applied to aid in learning non-linear correlations between the images and features. The pooling layers (e.g., max-pooling layers) reduce spatial dimensionality by down-sampling feature maps and producing encodings (e.g., vectors) that each capture abstract and higher-level data of a respective image. In one specific implementation, the encoder 210, at least initially, is a pre-trained MobileNet V2 classification network. Any of a variety of standard datasets may be used for the pre-training. In one specific implementation, the pretraining may be performed using the ImageNet-1k dataset. When the encoder has not been further specialized, it may be referred to herein as a "generic encoder".

The decoder 220 is the second half of the model. It may include upsampling layers followed by regular convolution layers to semantically project the encodings produced by the encoder 210 onto pixel space to produce pixel-wise segmentation maps for the images. The upsampling layers may perform transposed convolutions that enhance spatial dimensions by constructing a sparse kernel and applying it to features. The upsampling layers learn to fill gaps between locations in features maps thus boosting spatial dimensionality back to pixel-level.

A trained image-based ML model (e.g., a semantic segmentation model structured according to an encoder-decoder architecture) may be incorporated into a consumer software application to perform a variety of image classification and analysis tasks. In one embodiment, the task is the detection of deterioration (e.g., rust). In response to an image of infrastructure, the trained image-based ML model may produce a segmentation map that indicates presence of a type of deterioration (e.g., a type of rust, such as real rust, rust fade, rust stain, etc.) at the pixel-level. Such segmentation map may be used to provide a visualization to a user (e.g., to direct repair or maintenance operations), or as a basis for further analysis tasks by other software.

FIG. 3 is an example sequence of steps 300 that may be performed to produce a labeled training dataset and train an image-based ML model. The steps 300 of FIG. 3 may be performed by the dataset labeling software process 100 and/or other software.

At step 310, the dataset labeling software process 100 acquires an initial set of images available for training. In one embodiment, the initial set of images is an unlabeled set of images. However, alternatively, the set may include some images having some amount of existing labeling, that may, for example, require additional labeling. In the case of detection of deterioration (e.g., rust) on infrastructure, the images may be photographs of the infrastructure captured by engineers using handheld digital cameras, drones, or other specialized equipment.

At step 320, the dataset labeling software process 100 computes dissimilarity between each image of the initial set of images. In one embodiment, the dataset labeling software process 100 computes the dissimilarity by encoding each image to produce encodings that that represent features (e.g., using, at least initially, a generic encoder of the semantic segmentation model pre-trained on a non-specialized data), calculating a similarity measure between each of the encodings to form a similarity matrix that quantifies how similar each of the images are to each other, and then calculating a diversity metric for each image based on a line in the similarity matrix that corresponds to the image.

FIG. 4 is a diagram 400 providing further details of an example technique for computing dissimilarity between images that may be executed as part of step 320 of FIG. 3. At step 410, the dataset labeling software process 100 applies each of the images 402 of the initial set of images to an encoder (e.g., just the pre-trained MobileNet V2 classification network of the image-based ML model shown in FIG. 2) to produce a series of encodings 412 that represent features. Again, the encodings 412 are reduced dimension representations (e.g., vectors) that capture abstract and higher-level data of respective images.

In some embodiments, as part of step 410, additional non-image derived information may be added to the encodings 412 (e.g., by adding additional data elements to the vector). The additional information may include localization information (e.g., global positioning system (GPS) coordinates, orientation data, etc.) describing where the image was captured, date and time information describing when the image was captured, weather condition information describing the conditions under which the image was captured, camera and lens information describing the equipment used to capture the image, company or user information describing the entity or person which captured the image, as well as a wide variety of other information. In some cases, the additional information may include information produced from other software applications that utilize the same image. For example, if the same image was used by a structure from motion (SfM) photogrammetry application as to produce a three-dimensional (3D) model, camera location computed in aerotriangulation operations by such software may be used as localization information (e.g., as an alternative or supplement to GPS coordinates).

At step 420, the dataset labeling software process 100 calculates a similarity measure between each of the encodings 412. Images that have content that is similar (are semantically close) should be close to each other in encoded space, while images that are dissimilar (are semantically divergent) should be far from each other in encoded space. Such similarity may transcend pixel-level relationships. For example, two images that represent the same object, or same kind of object, may be deemed similar even if they are completely different pixel-wise. Further, in embodiments where the encodings 412 include more than just image-derived information, similarity may transcend visual relationships. For example, two images captured at nearby locations, on the same date about the same time, using the same camera and lens may be deemed similar even if they have only marginal visual similarity. In one embodiment the similarity measure is a cosine distance. However, it should be understood that alternatively a variety of other similarity measures may be calculated, for example, a Euclidean distance, a Jaccard similarity, etc, and used individually or in combination.

At step 430, the dataset labeling software process 100 organizes the similarity measures (e.g., cosine distances) into a similarity matrix 432 that quantifies how similar each of the images are to each other. Each image of the initial set of images may be represented by a row and column of the similarity matrix. As such, excluding the major diagonal of the matrix, the elements of a line (i.e., a row or column) in the similarity matric 432 collectively represents similarity of the respective image to all the other images of the initial set of images.

At step 440, the dataset labeling software process 100 calculates a diversity metric 442 for each image of the initial set of images based on a line in the similarity matrix 432 that corresponds to the image. In one embodiment, the diversity metric 442 may be calculated as the norm of the line in the similarity matrix. However, it should be understood that other functions may be used to calculate the diversity metric.

Returning to FIG. 3, after the dataset labeling software process 100 computes dissimilarity between each image of the initial set of images, at step 330, it selects a sub-set of images from the initial set of images based on dissimilarity from each other. For example, the dataset labeling software process 100 may select a predetermined number of images that have the greatest dissimilarity using a diversity selection algorithm. These images may be used to seed the labeled training dataset. At the beginning of training, the image-based ML model may be uncertain about pretty much any image uniformly, rendering uncertainty data unhelpful. Accordingly, diversity alone may be used to select images used in initial training.

Any of a variety of diversity selection algorithms may be used to select of images that have the greatest dissimilarity. In one embodiment, a k-Center Greedy algorithm may be used. The algorithm may begin with the image having the greatest diversity metric (e.g., whose line has the greatest norm in the similarity matrix) and then progressively choose center points such that the largest distance between and image and a center point is minimized. Alternatively, a smallest cumulative distance algorithm may be used. Again, beginning with the image having the greatest diversity metric (e.g., whose line has the greatest norm in the similarity matrix) additional images may be added that would minimize the cumulative distance (i.e., images having lines in the matrix for which the sum would be minimal).

At sub-step 332, the dataset labeling software process 100 solicits a user for input and labels each of the images of the selected sub-set of images in response thereto. The image may be displayed in a user interface of the dataset labeling software process 100 and the user prompted to annotate on the image region (e.g., groups of pixels) that have particular qualities. Returning to the example of detection of deterioration (e.g., rust), the user may be prompted to annotate regions that exhibit types of deterioration (e.g., types of rust). Further, at sub-step 334, the dataset labeling software process 100 adds the sub-set of images to the labeled training dataset.

At step 340, one or more image-based ML models are trained using the labeled training dataset. The one or more image-based ML models may be an ensemble of image-based ML models that have an identical architecture, but that are initialized with different random weights. Stochastic optimization algorithms (e.g., stochastic gradient descent) used by most image-based ML models requires that weights of neural networks be initialized to small random values. By varying these small random values, the models may learn differently and produce differing predictions.

At step 350, the dataset labeling software process 100 computes uncertainty of the one or more image-based ML models for remaining images of the initial set of images (i.e., images that have not already been selected for inclusion in the labeled training dataset). Computation may be performed using a first procedure that prioritizes reduction of the size of the labeled training dataset over computing resource consumption (i.e., data efficiency over computation efficiency). In one embodiment, the first procedure for computing uncertainty may be based on ensemble learning, and uncertainty may be a disagreement score for each image that measures disagreement between predictions of each of model of an ensemble of image-based ML models.

FIG. 5 is a diagram 500 providing further details of an example technique for computing a disagreement score that measures disagreement between predictions of each of an ensemble of image-based ML models that may be executed as part of step 350 of FIG. 3. At step 510, the dataset labeling software process 100 applies an image 512 from the remaining images to an ensemble of image-based ML models 514 that have been initialized with different random weights, which produce class predictions for pixels in the image to build pixel-wise segmentation maps 516.

At step 520, the dataset labeling software process 100 organizes the pixel-wise segmentation maps 516 into a stack 522, which relates all the class predictions for each pixel.

At step 530, the dataset labeling software process 100 determines a modal class prediction and produces a modal prediction map 532. For example, in the case of detection of deterioration (e.g., rust) on infrastructure, one of the ensemble of image-based ML models 514 may predict a particular pixel shows good condition while the rest of the ensemble of image-based ML models 514 may predict the pixel shows a particular type of deterioration (e.g., rust). In such case, the corresponding location in the modal prediction map 532 would indicate set to that type of deterioration.

At step 540, the dataset labeling software process 100 determines a variation ratio for each pixel by comparing each segmentation map 516 to the modal prediction map 532, and produces a variation ratio mask 542. The variation ratio map may indicate where the ensemble of image-based ML models 514 is most confused about the image. The variation ratio for a pixel may be determined as the proportion of class predictions from the segmentation maps 516 that are not the modal class prediction from the modal prediction map 532.

At step 550, the dataset labeling software process 100 calculates a disagreement score 552 for the image based on the variation ratio mask 542. In one embodiment, the disagreement score may be calculated as the average of the variation ratio of each pixel.

Returning to FIG. 3, after the dataset labeling software process 100 computes uncertainty for remaining images of the initial set of images, at step 360, it selects a sub-set of images from the remaining images based on a combination of dissimilarity from each other and uncertainty. A number of images having the greatest combined dissimilarity and uncertainty are selected for the subset. Depending on the embodiment, the dissimilarity and uncertainty may be combined in different ways. In one embodiment, the disagreement score of each image is combined with the diversity metric that image with a linear weight. The linear weight may gradually increase the weight of the disagreement score as training proceeds and the one or more image-based ML models become more confident in their predictions. In an alternative embodiment, a Kalman filter is employed to dynamically combine the disagreement score of each image with the diversity metric.

At sub-step 362, the dataset labeling software process 100 solicits a user for input and labels each of the images of the selected sub-set of images in response thereto. The image may be displayed in a user interface of the dataset labeling software process 100 and the user prompted to annotate on the image region (e.g., groups of pixels) that have particular qualities. Further, at sub-step 364, the dataset labeling software process 100 adds the sub-set of images to the labeled training dataset.

At step 370, the dataset labeling software process 100 repeats at least steps 340-360 until a stopping condition is met to build the labeled training dataset. The stopping condition may a measure of uncertainty. In one embodiment, the stopping condition may be that an aggregate of the disagreement score for each remaining image of the initial set of images is below a disagreement threshold. The disagreement threshold may be a predetermined threshold (e.g., selected by a user) or dynamically determined. In one embodiment, the disagreement threshold may be set to 10% of aggregate of the disagreement scores produced on a first iteration of the sequence of steps.

In some cases (e.g., in response to user requirements), after step 370, the dataset labeling software process 100 may proceed directly to step 390, where a final labeled training dataset is returned, and the labeled training dataset is used to train a final image-based ML model. The final trained image-based ML model may thereafter be incorporated into a consumer software application to perform an image classification and analysis task. Returning to the example of detection of deterioration (e.g., rust), the trained image-based ML model may now be used to generate visualization (e.g., to direct repair or maintenance operations) or to provide other output indicating presence of a type of deterioration (e.g., type of rust).

Alternative, after step 370, the dataset labeling software process 100 may further build the labeled training dataset at step 380, by repeating at least steps 340-360 using a different, second procedure for computing uncertainty. The steps may be repeated until a further stopping condition is met. The second procedure may prioritize computing resource consumption over reduction of the size of the labeled training dataset (i.e., computation efficiency over data efficiency). In one embodiment, the second procedure for computing uncertainty may be based Monte-Carlo dropout, in which always-active dropout layers in a single image-based ML model randomly set weights to zero to enable the single model to produce different predictions for the same image at inference time.

When repeated using Monte-Carlo dropout, at step 340, a single image-based ML model with always-active dropout layers may be trained using the labeled training dataset. Usually, dropout layers are only enabled in training to randomly set weights to zero to avoid over fitting and over reliance on certain connections. Here, dropout layers may be enabled for both training and inference, and thereby always-active.

FIG. 6 is a block diagram 600 of an example image-based ML model (e.g., semantic segmentation model) that includes always-active dropout layers 610. In this example, the model is structured according to an encoder-decoder architecture (e.g., a U-Net architecture) having an encoder 620 and decoder 630. As discussed above in relation to FIG. 2, such an architecture may include convolutional layers, activation functions, and pooling layers in the encoder 620 and up sampling and convolution layers in the decoder 640. The always-active dropout layers 610 may be located in both the encoder 620 and decoder 630. In one embodiment, the always-active dropout layers 610 are located toward the middle of the architecture (i.e., near the "bottleneck"), where information is most condensed to have maximum impact on output variance and to avoid unwanted artifacts in the produced output. The always-active dropout layers 610 may utilize different dropout rates in training and inference. In one embodiment, the dropout layers 610 may utilize a lower dropout rate in training than in inference to not unduly hamper learning while ensuring sufficient variation.

When repeated using Monte-Carlo dropout, at step 350 the dataset labeling software process 100 computes uncertainty of the single image-based ML models for remaining images of the initial set of images. The uncertainty may be represented as a disagreement score that measures disagreement between predictions of the image-based ML model with different weights set to zero.

FIG. 7 is a diagram 700 providing further details of an example technique for computing a disagreement score between predictions of a single image-based ML model with different weights set to zero that may be executed when repeating step 350 of FIG. 3 with Monte-Carlo dropout. At step 710, the dataset labeling software process 100 repeatedly applies an image 712 from the remaining images to the single image-based ML model 714 with different weights set to zero to produce class predictions for pixels in the image to build pixel-wise segmentation maps 716.

At step 720, the dataset labeling software process 100 organizes the pixel-wise segmentation maps 716 into a stack 722, which relates all the class predictions for each pixel.

At step 730, the dataset labeling software process 100 determines a modal class prediction and produces a modal prediction map 732.

At step 740, the dataset labeling software process 100 determines a variation ratio for each pixel in the image by comparing each segmentation map 716 to the modal prediction map 732 and produces a variation ratio mask 742. The variation ratio for a pixel may be determined as the proportion of class predictions from the segmentation maps 716 that are not the modal class prediction from the modal prediction map 732.

At step 750, the dataset labeling software process 100 calculates a disagreement score 752 for the image based on the variation ratio mask 742. In one embodiment, the disagreement score may be calculated as the average of the variation ratio for each pixel.

Returning to the repetition of steps of FIG. 3 using Monte-Carlo dropout, at step 360 the dataset labeling software process 100 again selects a sub-set of images from the remaining images based on a combination of dissimilarity from each other and uncertainty (here from Monte-Carlo dropout). A number of images having the greatest combined dissimilarity and uncertainty may be selected for the subset. Again, the dissimilarity and uncertainty may be combined in different ways.

Thereafter, at step 370, the dataset labeling software process 100 again repeats at least steps 340-360 using Monte-Carlo dropout until a further stopping condition is met to further build the labeled training dataset. The further stopping condition may be a measure of prediction accuracy improvement. In one embodiment, the stopping condition may be that a measure of prediction accuracy improvement is below an improvement threshold. Typically, prediction accuracy improvement is asymptotic relative to the number of labeled images, such that the larger the labeled training dataset the smaller the likely increase in accuracy for adding additional labeled images (e.g., going from 5 to 10 labeled images might increase accuracy 15%, but going from 100 to 105 labeled images might only increase accuracy 0.7%). A measure of prediction accuracy improvement may be calculated as the derivative of a function that compares prediction accuracy improvement by the number of added labeled images. The improvement threshold may be a predetermined number (e.g., selected by a user) or dynamically determined. In such manner, the improvement threshold may be adjusted to meet particular customer requirements.

A variation of the above describe techniques may be applied to model finetuning. There may be an existing trained image-based ML model (e.g., trained using a public labeled training dataset) and there may be a desire to specialize it for a particular customer requirement (e.g., using a custom labeled training dataset). Just as in initial training, there is often a desire to improve data efficiency (while also not consuming excessive computing resources) when specializing image-based ML model by finetuning.

FIG. 8 is a sequence of steps 800 that may be performed to produce a custom labeled training dataset and finetune an image-based ML model. The steps 300 of FIG. 3 may be performed by the dataset labeling software process 100 and/or other software.

At step 810, the dataset labeling software process 100 acquires an initial set of images available for finetuning. In one embodiment, the initial set of images is an unlabeled set of images.

At step 820, the dataset labeling software process 100 computes dissimilarity between each image of the initial set of images available for finetuning and images of the labeled training dataset (e.g., the public labeled training dataset) on which the image-based ML model was originally trained. The dissimilarity may be calculated similar to step 320 of FIG. 3 by producing encodings that that represent features, calculating a similarity measure between the encodings to form a similarity matrix, and then calculating a diversity metric for each image based on a line in the similarity matrix.

At step 830, the dataset labeling software process 100 computes uncertainty of the pre-trained image-based ML model for each image of the initial set of images. The uncertainty of the pre-trained image-based ML model may be calculated similar to step 350 of FIG. 3 by using ensemble learning and/or Monte-Carlo dropout based techniques.

At step 840, the dataset labeling software process 100 selects a sub-set of images from the initial set of images based on a combination of dissimilarity from each other and uncertainty for each image. Similar to in step 360 of FIG. 3, at sub-step 842, the dataset labeling software process 100 solicits a user for input and labels each of the images of the selected sub-set of images in response thereto. Further, at sub-step 844, the dataset labeling software process 100 adds the sub-set of images to the custom labeled training dataset.

At step 850, the image-based ML model is retrained using the custom labeled training dataset.

Thereafter, at step 860, the dataset labeling software process 100 repeats at least step 830-850 to until a stopping condition is met to finetune the image-based ML model. Similar to in step 370 of FIG. 3, the stopping condition may be that a measure of prediction accuracy improvement is below an improvement threshold.

A variation of the above describe techniques may also be applied to visualization and monitoring of a trained image-based ML model during inference in order to enhance user confidence. While no image-based ML model may provide perfect predictions in every circumstance, user trust can be enhanced by providing cues when predictions may be inaccurate.

FIG. 9 is a sequence of steps 900 that may be performed to provide cues when predictions of a trained image-based ML model may be inaccurate. At step 910, software receives a new image and applies it to the trained image-based ML model.

At step 920, the software computes dissimilarity between the new image of the original labeled training dataset on which the image-based ML model was originally trained. The dissimilarity may be calculated similar to step 320 of FIG. 3 by producing an encoding for the new image that represents features, calculating a similarity measure between the encoding and each of the encodings of images of the original labeled training dataset, and then calculating a diversity metric for the new image images based on a combination of the similarity measures.

At step 930, the software computes uncertainty for the new image. The uncertainty of the new image may be calculated similar to step 350 of FIG. 3 by using ensemble learning and/or Monte-Carlo dropout based techniques.

At step 940, the software compares dissimilarity of the new image, uncertainty for the new image, and/or a combination of dissimilarity and uncertainty for the new image to one or more thresholds, and determines whether the new image should be flagged. In one embodiment, dissimilarity of the new image is compared to a user-provided dissimilarity threshold, and uncertainty of the new image is compared to a user-provided uncertainty threshold, and if either threshold is exceeded the new image is flagged.

At step 950, the software outputs (e.g., displays in a user interface) prediction results for the new image, and if the new image was flagged, an indication that the prediction may be inaccurate. The indication may include a visualization of the computed dissimilarity, uncertainty and/or combination of the dissimilarity and the uncertainty for the new image, to enable the user to understand why the prediction may be inaccurate.

In summary, the above description describes example techniques for improving data efficiency that combines diversity selection and with one or more uncertainty selection techniques. It should be understood that various adaptations, modifications, extensions and the like may be readily made to improve the described capabilities or to provide additional capabilities.

While it is described above that functionality may be implemented in a specific manner by software on specific hardware, it should be understood that the functionality may also be implemented in different manners by different software on different hardware. Software may include instructions in a high-level programming language or low-level programming language that may be stored and compiled or interpreted to run on hardware. For example, instructions may be stored on a non-transitory electronic device readable medium and when executed on one or more processors is operable to implement the functionality.

It should be understood that the ordering of any method steps discussed above may be changed to suit various situations or requirements. Absent an explicit indication to the contrary, the order of steps described above may be modified such that a subsequent step occurs before a preceding step, or in parallel to such step.

Above all, it should be understood that the above descriptions are meant to be taken only by way of example. What is claimed is:

The invention claimed is:

1. A method for training an image-based machine learning (ML) model, comprising:

in an initial stage, computing, by a software process executing on one or more computing devices, a dissimilarity between each image of an initial set of images available for training, and selecting, by the software process, a first sub-set of images from the initial set of images based on the dissimilarity from each other, labeling the first sub-set of images, and adding the labeled first sub-set of images to a labeled training dataset;

training one or more image-based ML models on the labeled training dataset;

in a subsequent stage, computing, by the software process, an uncertainty of the one or more image-based ML models for remaining images of the initial set of images, and selecting, by the software process, a second sub-set of images from the remaining images of the initial set of images based on a combination of the dissimilarity from each other and the uncertainty of the one or more image-based ML models, labeling the second sub-set of images, and adding the second sub-set of images to the labeled training dataset;

repeating the training the one or more image-based ML models, and the computing the uncertainty of the one or more image-based ML models, and the selecting the second sub-set of images of the subsequent stage until a stopping condition is met to build the labeled training dataset; and using the labeled training dataset to train the image-based ML model.

2. The method of claim 1, wherein the one or more image-based ML models are an ensemble of image-based ML models, and the uncertainty of the one or more image-based ML models for each remaining image is a disagreement score for each image that measures disagreement between predictions of each of the image-based ML models of the ensemble.

3. The method of claim 2, wherein the stopping condition is that an aggregate of the disagreement score for each image is below a disagreement threshold.

4. The method of claim 1, further comprising:

further building the labeled training dataset by repeating the training the one or more image-based ML models, the computing the uncertainty of the one or more image-based ML models, and the selecting the second sub-set of images in a still further stage using a different procedure for computing uncertainty.

5. The method of claim 1, further comprising:

training a single image-based ML model on the labeled training dataset;

in a still further stage, computing, by the software process, an uncertainty of the single image-based ML model for the remaining images of the initial set of images using Monte-Carlo dropout, and selecting, by the software process, a third sub-set of images from the remaining images of the initial set of images based on a combination of the dissimilarity from each other and the uncertainty of the single image-based ML model, labeling the third sub-set of images, and adding the third sub-set of images to the labeled training dataset; and repeating the training the ML model, and the computing the uncertainty of the single image-based ML model, and the selecting the third sub-set of images of the still further stage until a further stopping condition is met.

6. The method of claim 5, wherein the uncertainty of the single image-based ML model is a disagreement score that measures disagreement between predictions of the single image-based ML model with different weights set to zero.

7. The method of claim 5, wherein the further stopping condition is that a predicted accuracy improvement of adding additional labeled images to the labeled training dataset is below an improvement threshold.

8. The method of claim 1, wherein the computing the dissimilarity further comprises:

encoding each image of the initial set of images into encodings that represent features;

calculating similarity measures between each of the encodings;

organizing the calculated similarity measures between each of the encodings into a similarity matrix that quantifies how similar each of the images are to each other; and calculating a diversity metric for each image of the initial set of images based on a line in the similarity matrix that corresponds to the image.

9. The method of claim 8, wherein the selecting the first sub-set of images selects images having greatest dissimilarity based on the diversity metric of each image.

10. The method of claim 1, further comprising:

using the trained image-based ML model to form a prediction for a new image.

11. The method of claim 10, further comprising:

computing, by the software process, a dissimilarity between the new image and the labeled training dataset;

computing, by the software process, an uncertainty of the prediction for the new image;

flagging the new image for review based on the dissimilarity between the new image and the labeled training dataset, the uncertainty of prediction for the new image or a combination of the dissimilarity between the new image and the labeled training dataset and the uncertainty of prediction for the new image exceeding a threshold; and outputting an indication that the prediction for the flagged new image is potentially inaccurate.

12. A non-transitory computing device readable medium having instructions stored thereon, the instructions when executed by one or more computing devices operable to:

in an initial stage, compute a dissimilarity between each image of an initial set of images in available for training, and select a first sub-set of images from the initial set of images based on the dissimilarity from each other, label the first sub-set of images, and add the labeled first sub-set of images to a labeled training dataset;

in a subsequent stage, compute an uncertainty of one or more image-based machine learning (ML) models for each image of the initial set of images, and select a second sub-set of images from the initial set of images based on a combination of the dissimilarity from each other and the uncertainty, label the second sub-set of images, and add the sub-set of images to the labeled training dataset;

repeat the computation of the uncertainty the selection of the sub-set of images of the subsequent stage until a stopping condition is met to build the labeled training dataset; and use the labeled training dataset to train an image-based ML model.

13. The non-transitory electronic-device readable medium of claim 12, wherein the one or more image-based ML models are an ensemble of image-based ML models, and the instructions operable to compute the uncertainty further comprise instructions operable to:

compute a disagreement score for each image that measures disagreement between predictions of each of the image-based ML models of the ensemble.

14. The non-transitory electronic-device readable medium of claim 12, wherein the one or more image-based ML models are a single image-based ML model and the instructions operable to compute the uncertainty further comprise instructions operable to:

compute a disagreement score that measures disagreement between predictions of the single image-based ML model with different weights set to zero by Monte Carlo dropout.

15. The non-transitory electronic-device readable medium of claim 14, wherein the instructions operable to computing the dissimilarity comprise instructions operable to encode each image of the initial set of images into encodings that represent features;

calculate similarity measures between each of the encodings;

organize the calculated similarity measures between each of the encodings into a similarity matrix that quantifies how similar each of the images are to each other; and calculate a diversity metric for each image of the initial set of images based on a line in the similarity matrix that corresponds to the image.

16. The non-transitory electronic-device readable medium of claim 12, wherein the stopping condition is that a predicted accuracy improvement of adding additional labeled images to the labeled training dataset is below an improvement threshold.

17. A computing device configured to train an image-based machine learning (ML) model, comprising:

one or more processors; and a memory configured to store software for execution on the one or more processors, the software including a data labeling software process that is configured to:

in an initial stage, compute a dissimilarity between each image of an initial set of images available for training, and select a first sub-set of images from the initial set of images based on the dissimilarity from each other;

provide the first sub-set of images for training one or more image-based ML models;

in a subsequent stage, compute an uncertainty of the one or more image-based ML models for remaining images of the initial set of images, and select a second sub-set of images from the remaining images of the initial set of images based on a combination of the dissimilarity from each other and the uncertainty of the one or more image-based ML models;

provide the second sub-set of images for training the one or more image-based ML models; and repeat the computation of the uncertainty of the one or more image-based ML models, and the selection of the second sub-set of images of the subsequent stage, and the provision of the second sub-set of images for training until a stopping condition is met.

18. The computing device of claim 17, wherein the one or more image-based ML models are an ensemble of image-based ML models, the uncertainty of the one or more image-based ML models for each remaining image is a disagreement score for each image that measures disagreement between predictions of each of the image-based ML models of the ensemble, and the stopping condition is that an aggregate of the disagreement score for each image is below a disagreement threshold.

19. The computing device of claim 17, wherein the data labeling software process is further configured to:

encode each image of the initial set of images into encodings that represent features;

calculate similarity measures between each of the encodings;

organize the calculated similarity measures between each of the encodings into a similarity matrix that quantifies how similar each of the images are to each other; and calculate a diversity metric for each image of the initial set of images based on a line in the similarity matrix that corresponds to the image, wherein the first sub-set of images is selected as images having greatest dissimilarity based on the diversity metric of each image.

20. The computing device of claim 17, wherein the software further includes a trained image-based ML model that has been trained using the first sub-set of images and the second sub-set of images, and the trained image-based ML model is configured to:

form a prediction for a new image.

* * * * *